United States Patent
Ishii et al.

(10) Patent No.: US 7,525,789 B2
(45) Date of Patent: Apr. 28, 2009

(54) ELECTRONIC APPARATUS EMPLOYING ELECTROCHEMICAL CAPACITOR AND METHOD FOR RECOVERING CAPACITANCE OF ELECTROCHEMICAL CAPACITOR

(75) Inventors: Kiyohiro Ishii, Osaka (JP); Hiroyuki Maeshima, Hyogo (JP); Yasuyuki Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 252 days.

(21) Appl. No.: 11/568,828

(22) PCT Filed: Jun. 14, 2005

(86) PCT No.: PCT/JP2005/010845

§ 371 (c)(1),
(2), (4) Date: Nov. 8, 2006

(87) PCT Pub. No.: WO2006/001192

PCT Pub. Date: Jan. 5, 2006

(65) Prior Publication Data

US 2008/0013256 A1    Jan. 17, 2008

(30) Foreign Application Priority Data

Jun. 25, 2004    (JP)    ............................. 2004-187705

(51) Int. Cl.
*H01G 9/00*    (2006.01)
(52) U.S. Cl. ...................... 361/523; 361/525; 361/528; 361/529; 361/516; 361/519

(58) Field of Classification Search ......... 361/502–504, 361/508–512, 523, 525–528, 529–540, 516–519; 320/166–167; 29/25.01, 25.03
See application file for complete search history.

(56) References Cited

U.S. PATENT DOCUMENTS

| | | | |
|---|---|---|---|
| 5,754,394 A * | 5/1998 | Evans et al. ................. | 361/516 |
| 5,930,109 A * | 7/1999 | Fishler ....................... | 361/508 |
| 6,166,899 A * | 12/2000 | Tamamitsu ................. | 361/504 |
| 6,316,917 B1 * | 11/2001 | Ohta .......................... | 320/166 |
| 6,815,306 B1 * | 11/2004 | Strange et al. ............. | 438/379 |

FOREIGN PATENT DOCUMENTS

| | | |
|---|---|---|
| JP | 07-322492 | 12/1995 |
| JP | 2001-284187 | 10/2001 |
| JP | 2002-142369 | 5/2002 |

OTHER PUBLICATIONS

International Search Report for corresponding PCT International Application No. PCT/JP2005/010845 dated Aug. 23, 2005.

* cited by examiner

*Primary Examiner*—Nguyen T Ha
(74) *Attorney, Agent, or Firm*—RatnerPrestia

(57) ABSTRACT

An electronic apparatus has an electric load, an electrochemical capacitor, and an applying section. The electric capacitor includes a positive electrode, a negative electrode and an electrolyte placed between the positive electrode and the negative electrode and supplies electric power to the electric load. The applying section opens an electrical connection between the electrochemical capacitor and the electric load, and applies a minus potential to the positive electrode and a plus potential to the negative electrode.

11 Claims, 10 Drawing Sheets

FIG. 10 refresh mode for capacitor 8A (1) Separate capacitor 8A from main circuit and couple it to load R so as to discharge accumulated electric charges

↓

(2) Apply reversed polarity voltage to capacitor 8A

↓

(3) Couple to load R so as to discharge electric charges accumulated in capacitor 8A

↓ refresh mode for capacitor 8B (4) Couple capacitor 8A to main circuit, separate capacitor 8B from main circuit and couple it to load R so as to discharge accumulated electric charges

↓

(5) Apply reversed polarity voltage to capacitor 8B

↓

(6) Couple to load R so as to discharge electric charges accumulated in capacitor 8B

↓ refresh mode for capacitor 8C (7) Couple capacitor 8B to main circuit, separate capacitor 8C from main circuit and couple it to load R so as to discharge accumulated electric charges

↓

(8) Apply reversed polarity voltage to capacitor 8C

↓

(9) Couple to load R so as to discharge electric charges accumulated in capacitor 8C

↓

(10) Coupe capacitor 8C to main circuit

FIG. 11

|  | (1) | (2) | (3) | (4) | (5) | (6) | (7) | (8) | (9) | (10) |
|---|---|---|---|---|---|---|---|---|---|---|
| S1 | ON | ON | ON | OFF | OFF | OFF | OFF | OFF | OFF | OFF |
| S2 | OFF | OFF | OFF | ON | ON | ON | OFF | OFF | OFF | OFF |
| S3 | OFF | OFF | OFF | OFF | OFF | OFF | ON | ON | ON | OFF |
| S4 | OFF | OFF | OFF | ON | ON | ON | ON | ON | ON | ON |
| S5 | ON | ON | ON | OFF | OFF | OFF | OFF | OFF | OFF | OFF |
| S6 | ON | ON | ON | OFF | OFF | OFF | OFF | OFF | OFF | OFF |
| S7 | OFF | OFF | OFF | ON | ON | ON | ON | ON | ON | ON |
| S8 | ON | ON | ON | OFF | OFF | OFF | ON | ON | ON | ON |
| S9 | OFF | OFF | OFF | ON | ON | ON | OFF | OFF | OFF | OFF |
| S10 | OFF | OFF | OFF | ON | ON | ON | OFF | OFF | OFF | OFF |
| S11 | ON | ON | ON | OFF | OFF | OFF | ON | ON | ON | ON |
| S12 | ON | ON | ON | ON | ON | ON | OFF | OFF | OFF | ON |
| S13 | OFF | OFF | OFF | OFF | OFF | OFF | ON | ON | ON | OFF |
| S14 | OFF | OFF | OFF | OFF | OFF | OFF | ON | ON | ON | OFF |
| S15 | ON | ON | ON | ON | ON | ON | OFF | OFF | OFF | ON |
| S16 | OFF | ON | OFF | OFF | ON | OFF | OFF | ON | OFF | OFF |
| S17 | ON | OFF | ON | ON | OFF | ON | ON | OFF | ON | OFF |

ELECTRONIC APPARATUS EMPLOYING ELECTROCHEMICAL CAPACITOR AND METHOD FOR RECOVERING CAPACITANCE OF ELECTROCHEMICAL CAPACITOR

This Application is a U.S. National Phase Application of PCT International Application No. PCT/JP2005/010845 filed Jun. 14, 2005.

TECHNICAL FIELD

The present invention relates to a technology of recovering capacitance of an electrochemical capacitor in an electronic apparatus such as a vehicle driven by using a motor that is power-assisted by the electrochemical capacitor.

BACKGROUND ART

Recently, motor-driven vehicles have been manufactured and have received very much attention from the viewpoint of reduced environmental loading. In such a vehicle, basically, a fuel cell supplies electric power to a motor, thereby the motor is driven. At this time, since the fuel cell generates water without containing impurities, the emission of the water does not increase the environmental loading, which is greatly supported in the current environmental society.

When a motor is driven by a fuel cell, maximum electric power cannot be supplied to the motor from the fuel cell immediately after a switch is turned on. Consequently, with such a configuration, acceleration of the vehicle is very slow. Therefore, it is devised that a fuel cell and an electrochemical capacitor are coupled in parallel to a motor. That is to say, when electric power necessary for the motor is not sufficiently supplied from the fuel cell alone, for example, during acceleration of the vehicle, electric power is supplied from the electrochemical capacitor. Thus, acceleration performance can be improved.

In the case where the electrochemical capacitor is used in order to supplement the shortage of acceleration, however, capacitance of the electrochemical capacitor is reduced due to the long-term use. When the electrochemical capacitor is used for a long time, in a positive electrode and a negative electrode, ions approaching the positive and negative electrodes cause dielectric breakdown. Thereby, reaction products are generated on the surfaces of the positive and negative electrodes. When the reaction products are attached to the positive and negative electrodes, the surface areas of the positive and negative electrodes are reduced. Therefore, the number of ions in electrolyte attracted to the positive and negative electrodes is reduced, so that capacitance of the electrochemical capacitor is reduced. If such a reduction of capacitance is allowed to stand, the capacitance of the electrochemical capacitor is further reduced. When the capacitance of the electrochemical capacitor is reduced in this way, acceleration performance of the vehicle is deteriorated.

SUMMARY OF THE INVENTION

An electronic apparatus of the present invention includes an electric load, an electrochemical capacitor, and an applying section. The electrochemical capacitor has a positive electrode, a negative electrode and an electrolyte placed between the positive electrode and the negative electrode, and supplies electric power to the electric load. The applying section opens the electrical connection between the electrochemical capacitor and the electric load, and applies a minus potential to the positive electrode and a plus potential to the negative electrode. Thus, reduction of capacitance of the electrochemical capacitor can be suppressed. As a result, the deterioration of desired properties of an electronic apparatus to be used can be prevented. Furthermore, the present invention relates to a method for recovering capacitance of an electrochemical capacitor as mentioned above.

BRIEF DESCRIPTION OF THE DRAWINGS

FIG. 10 is a flowchart showing a detail of the refresh mode in the circuit shown in FIG. 9.

FIG. 11 shows states of switches S1 to S17 at the time of the refresh mode shown in FIG. 10.

DETAILED DESCRIPTION OF THE PREFERRED EMBODIMENTS

Figure 1A:
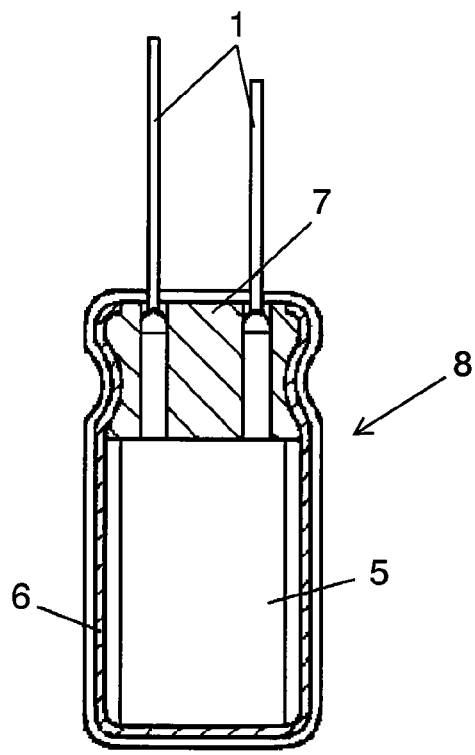
FIG. 1A is a sectional view showing an electric double-layer capacitor that is an electrochemical capacitor used in a vehicle in accordance with an exemplary embodiment of the present invention.
Figure 1B:
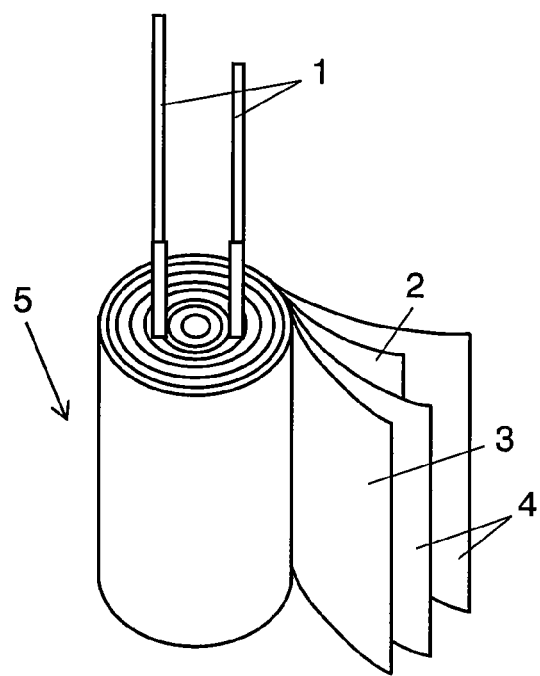
FIG. 1B is an exploded perspective view showing an internal structure of the electric double-layer capacitor shown in FIG. 1A.

FIG. 1A is a sectional view showing an electrochemical capacitor used in a vehicle in accordance with an exemplary embodiment of the present invention. FIG. 1B is an exploded perspective view showing an internal structure of the electrochemical capacitor shown in FIG. 1A. In the exemplary embodiment, an electric double-layer capacitor is used as the electrochemical capacitor.

Electric double-layer capacitor (hereinafter, referred to as "capacitor") 8 includes exterior case 6 in which element 5 is enclosed and which is sealed with sealing rubber 7. As shown in FIG. 1B, element 5 includes band-like separator 4, band-like positive electrode 2 and negative electrode 3. Positive electrode 2 and negative electrode 3 are wound spirally on the front and rear surfaces of separator 4. On the surfaces facing separator 4 of positive electrode 2 and negative electrode 3, activated carbon is provided, respectively. Between positive electrode 2 and negative electrode 3, an electrolyte, which is filled in exterior case 6, is placed. Terminals 1 are coupled to positive electrode 2 and negative electrode 3, respectively.

For exterior case 6, a collector of positive electrode 2 and a collector of negative electrode 3, aluminum is used from the viewpoint of weight and conductivity. Exterior case 6 may be formed of stainless steel or nickel-plated iron by giving priority to strength. The collectors of positive electrode 2 and negative electrode 3 may be formed of nickel, and the like. Sealing rubber 7 includes a material unaffected by an electrolyte, for example, ethylene propylene rubber, and the like. Separator 4 is composed of nonwoven fabric or microporous membrane of cellulose, polyethylene, polypropylene, and the like.

Capacitor 8 is manufactured as follows. Element 5 shown in FIG. 1B is subjected to vacuum drying at 110° C. for 12 hours, and then inserted into exterior case 6 under atmosphere at a dew point of −40° C. or less. Then, an electrolyte is filled in exterior case 6, followed by carrying out vacuum pressure impregnation and sealing with sealing rubber 7. The electrolyte is prepared by mixing tetraethylammonium tetrafluoroborate into a propylene carbonate solvent at a concentration of 0.69 mol/L.

In this configuration, a voltage is applied between positive electrode 2 and negative electrode 3 via terminals 1, and thereby, electric charges are accumulated. When electric charges are accumulated in this way, a voltage is generated between terminals 1. Then, electric power by capacitor 8 is supplied to an electric load. As mentioned above, an electric double-layer capacitor using an organic electrolyte as an electrolyte can be used at voltage ranging from 2.0V to 2.7V.

Figure 2A:
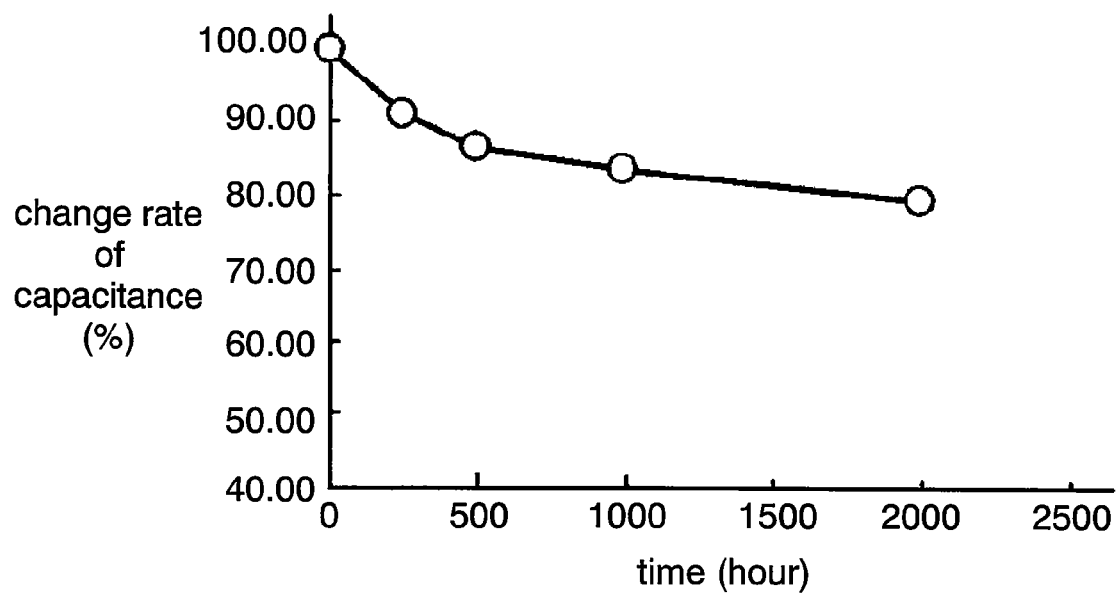
FIG. 2A is a graph showing a change over time of capacitance of an electrochemical capacitor in an acceleration test relating to a change over time of capacitance of the electric double-layer capacitor shown in FIG. 1A.

Next, the change over time of capacitance in the case where a voltage is applied to capacitor 8 is described. FIG. 2A shows the change of capacitance in an acceleration test in which 2.5V of voltage is continuously applied between positive electrode 2 and negative electrode 3 for 2000 hours and the atmospheric temperature is kept at 60° C.

Figure 2B:
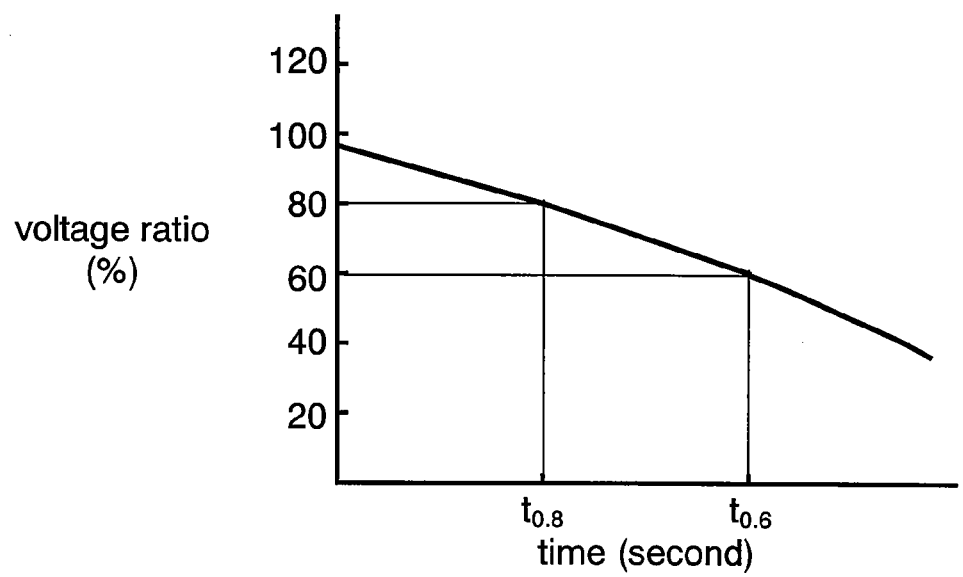
FIG. 2B is a graph showing a voltage change of the electric double-layer capacitor shown in FIG. 1A at the time of constant-current discharge.

The capacitance is calculated from the below-mentioned equation (1) as follows. That is to say, in a discharge curve as shown in FIG. 2B showing the change over time of voltage between positive electrode 2 and negative electrode 3 when constant-current discharge is carried out, the discharge curve when the voltage between the positive and negative electrodes is changed from 80% to 60% is linearly approximated.

$$C = I \times (t_{0.6} - t_{0.8}) / (0.8V_0 - 0.6V_0) \quad (1)$$

In equation (1), C denotes capacitance, I denotes current at the time of discharge, $V_0$ denotes charging voltage, $t_{0.6}$ denotes a time at $0.6V_0$, and $t_{0.8}$ denotes a time at $0.8V_0$.

As shown in FIG. 2A, as time passes, capacitance reduces, and the capacitance is reduced by about 20% at 2000 hours as compared with the capacitance at the time when the measurement is started.

After an electric double-layer capacitor whose capacitance has been reduced is fully discharged, a minus potential is applied to positive electrode 2 and a plus potential is applied to negative electrode 3. Herein, in general charge and discharge, an electrode showing relatively plus potential is positive electrode 2 and electrode 3 showing a minus potential is a negative electrode. Hereinafter, "a minus potential is applied to positive electrode 2 and a plus potential is applied to negative electrode 3 " is referred to as "a reversed polarity voltage is applied."

Figure 3:
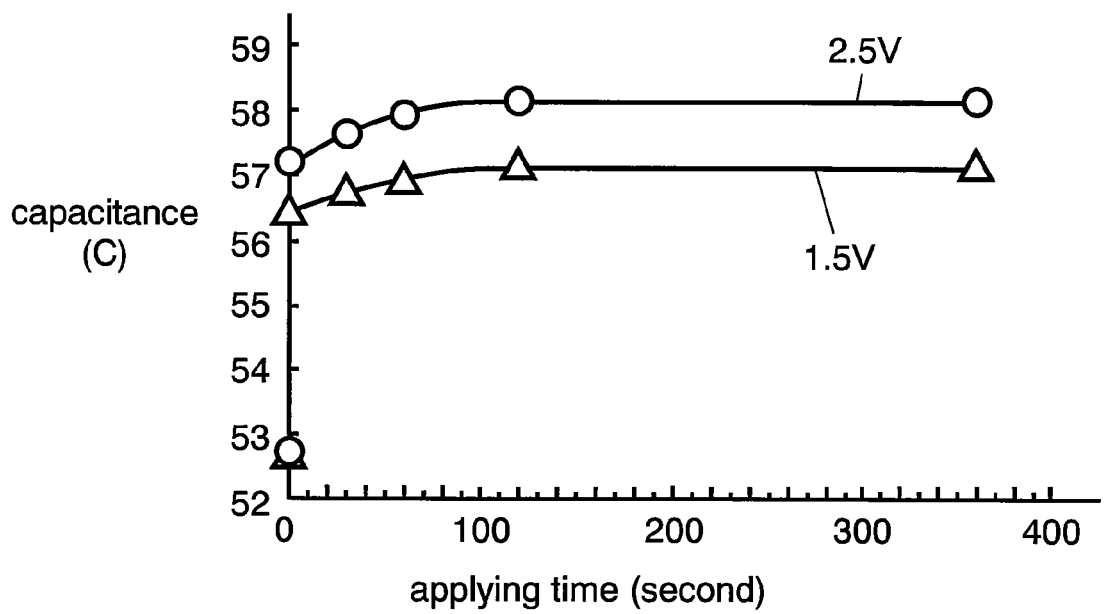
FIG. 3 is a graph showing a relation between capacitance and time for which a reversed polarity voltage is applied to the electrochemical capacitor shown in FIG. 1A.
Figure 4:
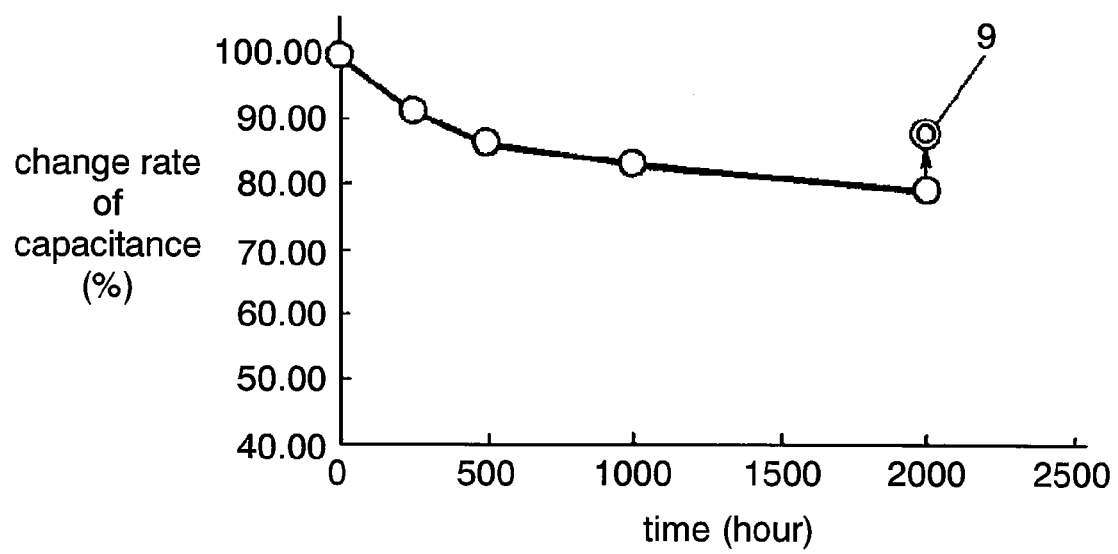
FIG. 4 is a graph showing recovery of capacitance by applying a reversed polarity voltage to the electrochemical capacitor shown in FIG. 1A.

FIG. 3 shows the change of capacitance when 1.5V of a reversed polarity voltage is applied between positive electrode 2 and negative electrode 3 and when 2.5 V of a reversed polarity voltage is applied therebetween. As is apparent from FIG. 3, in both cases, when the reversed polarity voltage is applied, the reduced capacitance is recovered. FIG. 4 shows the results of FIG. 2A and point 9 that shows a state in which the capacitance is recovered by applying a reversed polarity voltage. In this way, by applying a reversed polarity voltage to an electric double-layer capacitor whose capacitance has been reduced, the capacitance is recovered by 10% at the maximum.

It is thought that when a reversed polarity voltage is applied, ions remaining in the activated carbon of positive electrode 2 and negative electrode 3 are diffused. Thereby, the reaction products attached to the activated carbon surfaces of positive electrode 2 and negative electrode 3 are thought to be detached, the surface area of positive electrode 2 and negative electrode 3 is thought to be recovered, and the number of ions attracted by positive electrode 2 and negative electrode 3 is thought to be recovered. Thus, capacitance is recovered.

Furthermore, the recovered amount of capacitance is dependent upon a voltage to be applied. As the voltage is increased, the recovered amount is increased. This is thought that when the voltage to be applied is higher, energy for diffusing ions existing in an electrolyte is increased, so that the reaction products attached to positive electrode 2 and negative electrode 3 are thought to be actively detached. However, when a reversed polarity voltage larger than the normal-rated voltage of capacitor 8 is applied, deterioration may be promoted contrarily. Therefore, it is preferable that the reversed polarity voltage is not more than the normal-rated voltage of capacitor 8.

In this exemplary embodiment, an electric double-layer capacitor using an organic electrolyte as an electrolyte is described. Other than this, this recovering method is also effective to an electric double-layer capacitor using ambient temperature molten salt, and the like, as an electrolyte when a deterioration mechanism of capacitance is the same.

Furthermore, as shown in FIG. 3, a capacitance recovering effect in this exemplary embodiment can be exhibited by only one second of application, which shows the recovery corresponding to 98% or more of that exhibited after 6 minutes of application. After 30 seconds of application, the recovery corresponds to 99% or more of that exhibited after 350 seconds application. The effect is saturated in one to two minutes. That is to say, in this exemplary embodiment, the reversed polarity voltage is preferably applied for one second or more, and further preferably, for 30 seconds or more. The capacitance is rapidly recovered immediately after a reversed polarity voltage is applied. When the capacitance is recovered to some extent, even if the application time is increased, the capacitance is not recovered more. Energy stored in capacitor 8 by the application of an arbitrary reversed polarity voltage is saturated when a certain time has passed. Therefore, it is thought that diffusion of ions is gradually reduced, and that the recovered amount of the surface area of positive electrode 2 and negative electrode 3 is saturated. Consequently, the reversed polarity voltage exhibits the effect immediately after it is applied and a voltage may not be applied for a time longer than necessary. That is to say, it is not necessary to apply a reversed polarity voltage for longer than two minutes.

Such a technology of applying a reversed polarity voltage to an electric double-layer capacitor is disclosed in, for example, Japanese Patent Unexamined Publication No. 2002-142369. However, the technology disclosed in this publication is different from the present invention in that an object of the invention of the publication is to equalize a voltage of each cell in a capacitor unit in which single cells are connected in series. Furthermore, this publication discloses the content that is similar to the experiment described with reference to FIG. 2 and FIG. 4. However, a reversed polarity voltage is continued to be applied to the capacitor unit for five days. Thus, the above-mentioned publication and the present invention are remarkably different from each other in the time necessary to exhibit effects.

As mentioned above, capacitance of capacitor 8 is recovered by applying a reversed polarity voltage to capacitor 8. In this exemplary embodiment, an applying section for applying such a reversed polarity voltage is provided in an electronic apparatus such as a vehicle driven by a motor, deterioration of desired properties of the electronic apparatus is prevented.

Figure 5:
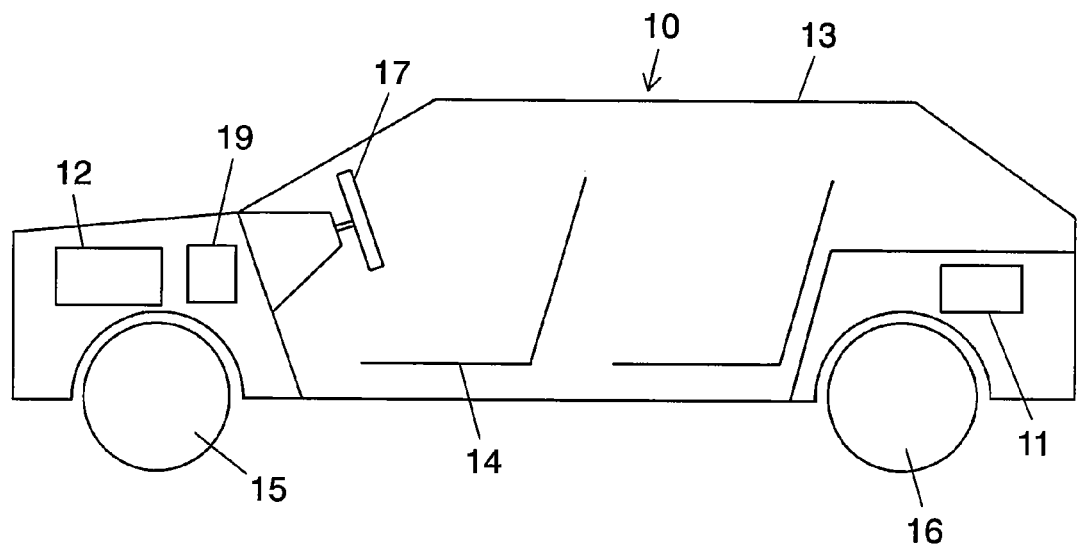
FIG. 5 shows a schematic configuration of a vehicle in accordance with an exemplary embodiment of the present invention.
Figure 6:
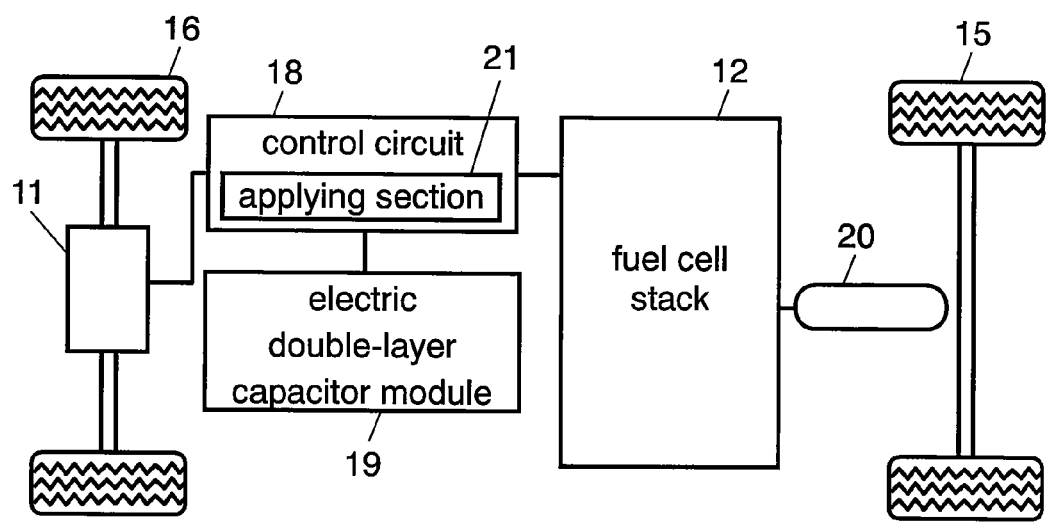
FIG. 6 is a conceptual diagram showing a drive system of the vehicle shown in FIG. 5.

FIG. 5 is a schematic view showing vehicle 10 driven by motor 11 that is an electric load, and FIG. 6 is a conceptual diagram showing a drive system of vehicle 10. Vehicle 10 includes car body 13, fuel cell stack (hereinafter, referred to as "fuel cell") 12 that is a power source disposed in car body 13, and electric double-layer capacitor module (hereinafter, referred to as "module") 19. In module 19, a plurality of capacitors 8 are coupled. Module 19 is coupled in parallel to fuel cell 12 via control circuit 18.

To fuel cell 12, hydrogen as a fuel is supplied from hydrogen supply source 20, and fuel cell 12 generates electric power by using this hydrogen and oxygen in the air. Control circuit 18 monitors voltages of fuel cell 12 and module 19 and controls supply of electric power to motor 11. Furthermore, control circuit 18 also controls charge of electric power from fuel cell 12 to module 19.

In a car formed by car body 13, driver's sheet 14 is arranged and steering 17 is disposed in front of it. Steering 17 is coupled to front wheel 15 that is a steering wheel. Motor 11 is coupled to rear wheel 16 that is a driving wheel. Control circuit 18 is electrically connected to motor 11.

Motor 11 rotates reversely and generates electricity during deceleration of vehicle 10. The electric power generated at this time is charged to module 19 via control circuit 18. Note here that a generator coupled to a driving body of motor 11 may be additionally provided, and electric power generated by this generator may be charged to module 19 via control circuit 18. Furthermore, control circuit 18 includes applying section 21 for applying a reversed polarity voltage to capacitor 8. Alternatively, applying section 21 may be provided in module 19.

Figure 7:
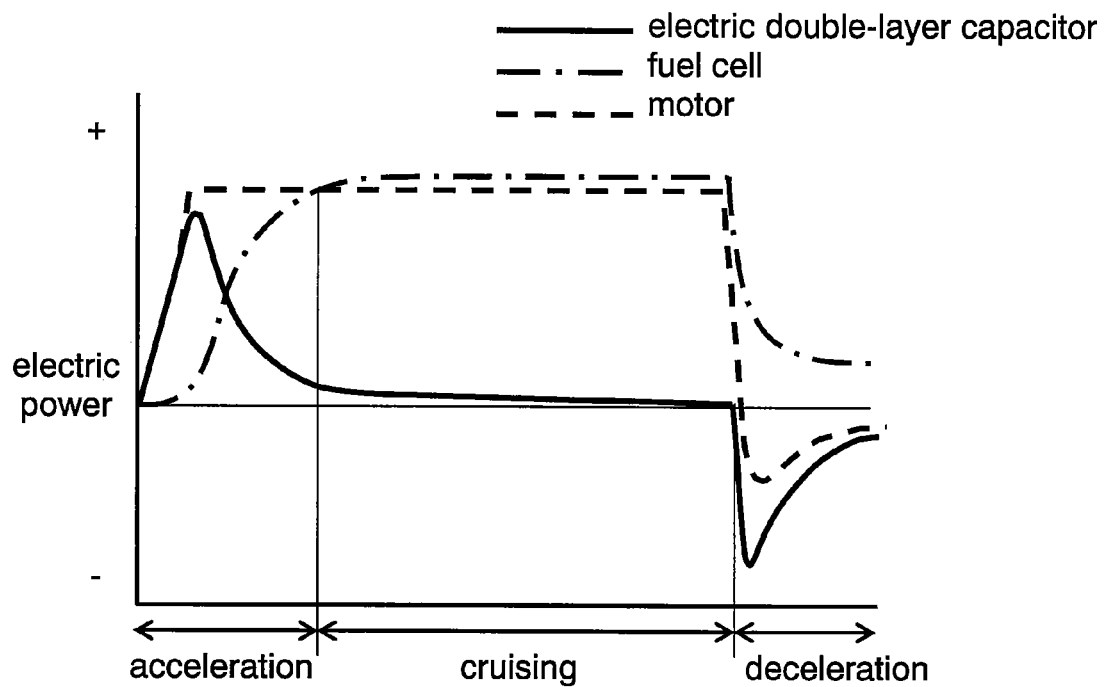
FIG. 7 is a graph showing a relation between electric power necessary for a motor and electric power supplied from an electrochemical capacitor module and a fuel cell stack with respect to running patterns of the vehicle shown in FIG. 5.

FIG. 7 shows a relation between electric power necessary for motor 11 and electric power supplied from fuel cell 12 and module 19 in various running patterns of vehicle 10. For understanding easily, electric power necessary for motor 11 is shown in the upper side when motor 11 is electrically driven and in the lower side when motor 11 reversely rotates and generates electricity. Furthermore, electric power supplied from fuel cell 12 and module 19 is shown in the upper side at the time of discharge (supply) and in the lower side at the time of charge.

During acceleration, since electric power from fuel cell 12 runs short, electric power is supplied from module 19 to motor 11. When the running pattern shifts to a cruising state in which acceleration and deceleration are hardly carried out, electric power is supplied mainly from fuel cell 12 to motor 11 since electric power is started to be supplied from fuel cell 12. During deceleration, since motor 11 functions as a generator, electric power generated at this time is accumulated in module 19.

Figure 8:
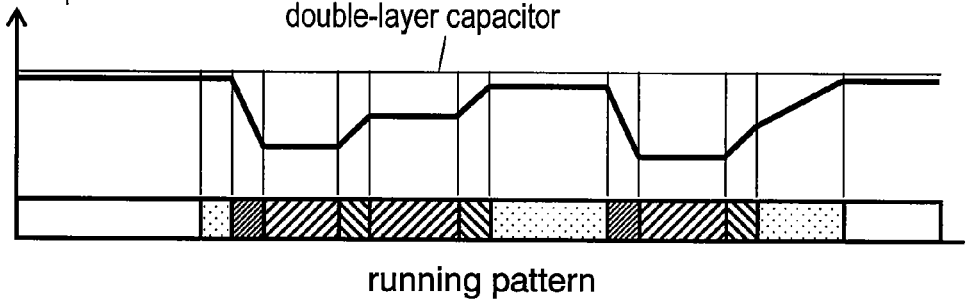
FIG. 8 is a graph showing a relation between the running patterns of the vehicle shown in FIG. 5 and a voltage between the positive and negative electrodes of the electrochemical capacitor.

FIG. 8 is a graph showing the change of voltage between the positive electrode and the negative electrode in capacitor 8 in module 19 when electric power is supplied to motor 11. In a general operation, since electric power is supplied from module 19 to motor 11 during acceleration, the voltage of capacitor 8 is reduced. During deceleration, since module 19 is charged with electric power generated by motor 11, the voltage of capacitor 8 is recovered. During cruising, since electric power is supplied mainly from fuel cell 12 to motor 1, the voltage of capacitor 8 is not reduced. During idling, since electric power is not supplied from module 19, the voltage of capacitor 8 is not changed. However, when the voltage of capacitor 8 is too low, charging may be carried out from fuel cell 12 in order to secure the electric power of module 19, which is necessary for acceleration.

In order to prevent the reduction of capacitance of capacitor 8 used in an electronic apparatus such as vehicle 10, it is desirable that a reversed polarity voltage is routinely applied to capacitor 8. It is preferably that it is applied while the electronic apparatus is driven.

However, when the reversed polarity voltage is applied to positive electrode 2 and negative electrode 3, it is not realistic in use to apply the reversed polarity voltage to all of the mounted capacitors 8 simultaneously. Then, in the case where the reversed polarity voltage is applied to capacitor 8 while an electronic apparatus is driven, it is necessary that capacitor 8 to be applied is separated from a main circuit that is coupled to an electric load. Then, capacitors 8, the number of which is the number capable of supplying electric power necessary for acceleration to motor 11, are maintained in a state in which a general operation can be carried out.

A method for realizing application of the reversed polarity voltage as mentioned above is described with reference to an electric double-layer capacitor module in which three capacitors 8 are coupled in series as an example.

Figure 9:
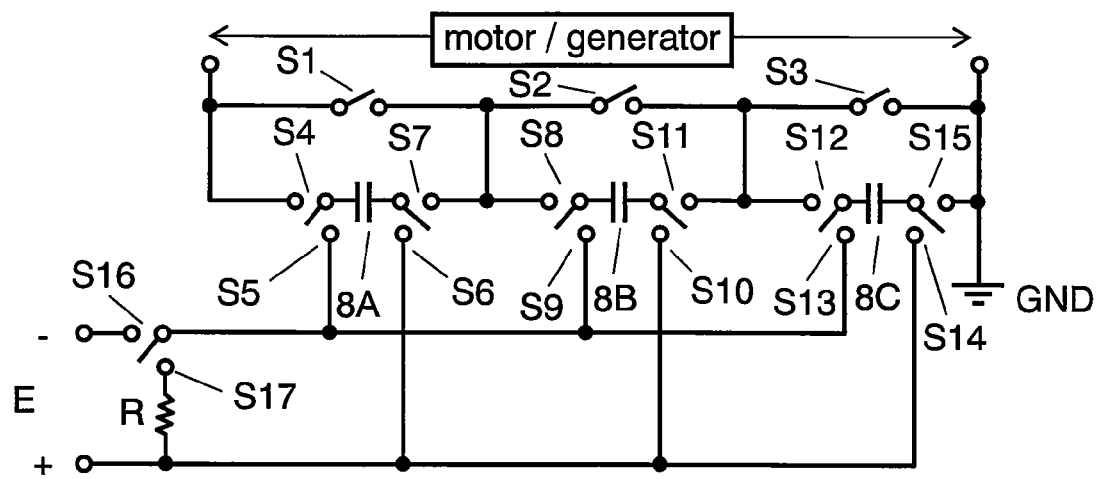
FIG. 9 is a circuit diagram for executing a refresh mode in a case where three electrochemical capacitors are coupled in series in the vehicle shown in FIG. 5.

FIG. 9 is a diagram showing a circuit configuration for applying the reversed polarity voltage to each electric double-layer capacitor in the case where three capacitors 8A, 8B, and 8C are coupled in series. FIG. 10 is a flowchart showing a procedure for applying the reversed polarity voltage to capacitors 8A, 8B, and 8C.

As a procedure for applying the reversed polarity voltage to an electric double-layer capacitor, firstly, an electric double-layer capacitor separated from a main circuit is coupled to load R, and electric charges accumulated during a general operation are discharged. For example, when capacitor 8A is separated, as in step (1), by turning off switches S4 and S7, electrical connection between capacitor 8A and the main circuit coupled to motor 11 is opened. At the same time, switch S1 is turned on. Then, switches S5, S6 and S17 are turned on.

After electric charges of capacitor 8A are discharged, as in step (2), switch S17 is turned off and switch S16 is turned on so as to couple capacitor 8A to power source E. Thus, a reversed polarity voltage is applied so as to recover capacitance. When the reversed polarity voltage is applied, the polarity of voltage between the positive and negative electrodes of capacitor 8A is reversed with respect to a general operation. In order to return the capacitor to the main circuit, it is necessary that electric charges accumulated by the application of the reversed polarity voltage are discharged by coupling capacitor 8A to loading R. To do so, as in step (3), switch S16 is turned off and switch S17 is turned on. Such a series of processing with respect to an electric double-layer capacitor for recovering capacitance is referred to as "refresh mode" hereinafter. The circuit for realizing a refresh mode shown in FIG. 9 composes applying section 21. Applying section 21 is included in, for example, control circuit 18 or module 19.

In this exemplary embodiment, the refresh mode is executed with respect to capacitors 8A, 8B and 8C, sequentially in this order. That is to say, as shown in FIG. 10, after the refresh mode is executed for capacitor 8A as shown in steps (1) to (3), the refresh mode is similarly executed for capacitor 8B as shown in steps (4) to (6), and then the refresh mode is similarly executed for capacitor 8C as shown in steps (7) to (9). Finally, as shown in step (10), capacitor 8C is coupled to the main circuit.

FIG. 11 shows states of switches S1 to S17 in steps (1) to (10) in FIG. 10. "ON" denotes a state in which a switch is closed, and "OFF" denotes a state in which a switch is open. Note here that step (10) shows a state of the switches in a general operation.

As mentioned above, when a refresh mode is executed for one electric double-layer capacitor, the other electric double-layer capacitors execute a general operation. With such a configuration, it is possible to execute the refresh mode even while electronic apparatus is driven.

Figure 12:
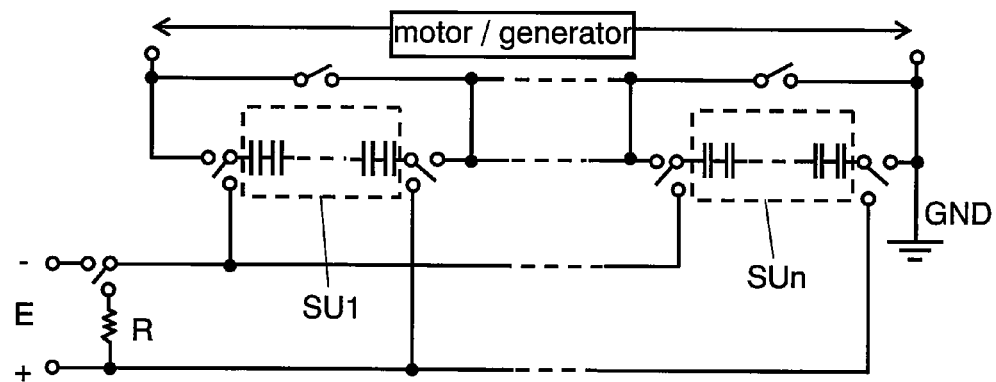
FIG. 12 is a circuit diagram for executing a refresh mode in a case where subunits including a plurality of electrochemical capacitors are coupled in series in the vehicle shown in FIG. 5.

In general, since a voltage necessary for motor 11 to drive vehicle 10 is as high as several hundreds V, when capacitor 8 has a low rated voltage, several tens to several hundreds capacitors 8 are needed. For example, when a driving voltage of motor 11 is 250 V, in the case where capacitor 8 having a rated voltage of 2.5V is used, it is necessary to connect at least 100 capacitors 8 in series. In the case where a large number of capacitors 8 are used in this way, a reversed polarity voltage may be applied to individual electric double-layer capacitors as mentioned above. Meanwhile, as shown in FIG. 12, the mounted electric double-layer capacitors may be divided into subunits SU1 to SUn and a refresh mode may be executed with respect to each subunit, sequentially. Each subunit is also configured of two or more electric double-layer capacitors as shown in a section surrounded by a dotted line in the drawing. In this way, even if electrochemical capacitors are divided into a plurality of subunits, the procedure for executing a refresh mode is the same as that in the above-mentioned configuration in which three capacitors 8 are coupled.

Figure 13:
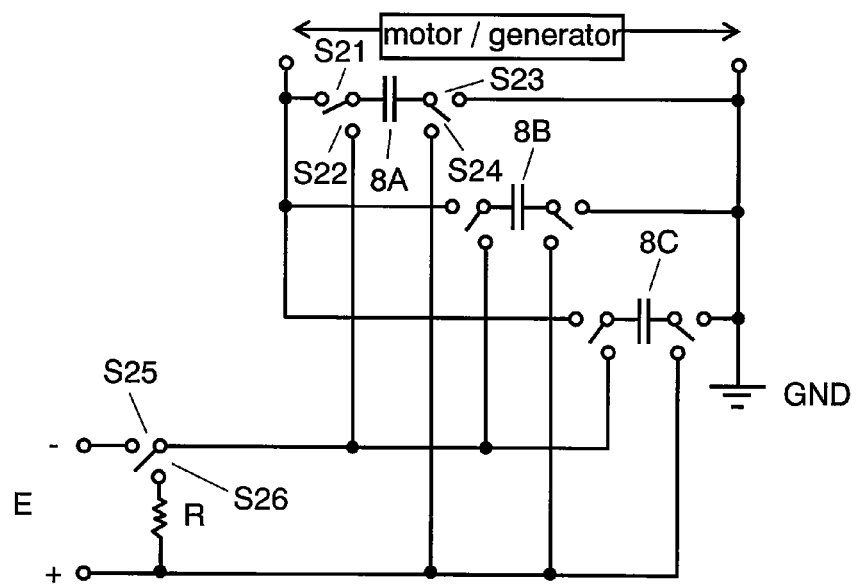
FIG. 13 is a circuit diagram for executing a refresh mode in a case where three electrochemical capacitors are coupled in parallel in the vehicle shown in FIG. 5.
Figure 14:
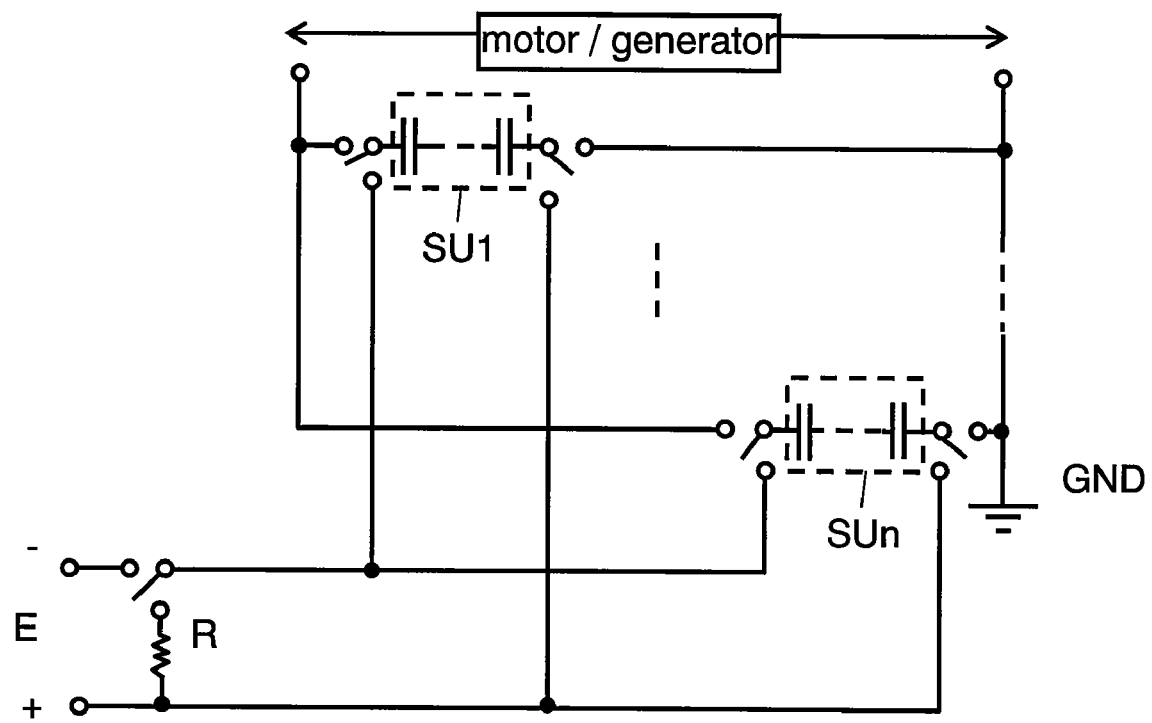
FIG. 14 is a circuit diagram for executing a refresh mode in a case where subunits including a plurality of electrochemical capacitors are coupled in parallel in the vehicle shown in FIG. 5

Furthermore, FIG. 13 shows a circuit configuration in which three electric double-layer capacitors are coupled in parallel, and FIG. 14 shows a circuit configuration in which subunits SU1 to SUn, in which a plurality of electric double-layer capacitors are coupled in series, are coupled in parallel. Even if electric double-layer capacitors or subunits are coupled in parallel as described above, the procedure for executing a refresh mode is the same as that in the above-mentioned configuration in which they are coupled in series. The refresh mode can be realized with a simple configuration of circuit shown in FIG. 13 or FIG. 14.

A switching operation for refreshing capacitor 8A is described with reference to FIG. 13 as an example. In order to separate capacitor 8A, switches S21 and S23 are turned off, respectively. Then, switches S22, S24 and S26 are turned on so as to couple capacitor 8A to load R, and electric charges of capacitor 8A are discharged. Then, after electric charges of capacitor 8A are discharged, switch S26 is turned off and switch S25 is tuned on, thus coupling capacitor 8A to power source E. Then, a reversed polarity voltage is applied so as to recover capacitance. When the reversed polarity voltage is applied, the polarity of voltage between the positive electrode and the negative electrode is reversed with respect to a general operation. In order to return to a main circuit, it is necessary that electric charges accumulated by the application of reversed polarity voltage are discharged by coupling capacitor 8A to charge R. To do so, switch S25 is turned off and switch S26 is turned on. Thereafter, by turning switches S25 and S26 off, and turning S22 and S24 off and turning S21 and S23 on, capacitor 8A is returned to the main circuit. Then, capacitors 8B and 8C are also subjected to the same operations.

As mentioned above, all the circuits for applying a reversed polarity voltage shown in FIGS. 9, 12, 13 and 14 are applying sections, which can be provided regardless of methods to be employed for coupling electric double-layer capacitors mounted on an electronic apparatus.

Note here that the present invention is not necessarily limited to an electric double-layer capacitor and can be applied to an electrochemical capacitor in which capacitance is recovered by applying a reversed polarity voltage. For example, the present invention can be employed to a hybrid capacitor using activated carbon for a positive electrode and graphite for a negative electrode.

Furthermore, in this exemplary embodiment, a vehicle in which fuel cell 12 is mounted as a power source is described. Other than this, the present invention may be applied to a vehicle in which a rechargeable battery is mounted as a power source or a hybrid vehicle in which at least one of a fuel cell and a rechargeable battery is mounted as a power source so as to drive motor 11 and engine is also mounted so as to drive a driving wheel. The present invention may be applied to apparatuses other than a vehicle.

INDUSTRIAL APPLICABILITY

Since an electronic apparatus provided with an applying section for applying a reversed polarity voltage to an electrochemical capacitor of the present invention can suppress the deterioration of the electrochemical capacitor, it is possible to prevent the deterioration of desired properties of the electronic apparatus so as to improve the reliability. This configuration is useful for an electronic apparatus on which an electrochemical capacitor is mounted.

The invention claimed is:

1. An electronic apparatus, comprising:
   an electric load;
   an electrochemical capacitor having a positive electrode, a negative electrode, and an electrolyte placed between the positive electrode and the negative electrode, and configured to supply electric power to the electric load; and
   an applying section configured to open an electrical connection between the electrochemical capacitor and the electric load, and to apply a minus potential to the positive electrode and a plus potential to the negative electrode for at least one second and at longest two minutes.

2. The electronic apparatus according to claim 1, wherein the electrochemical capacitor is one of a plurality of electrochemical capacitors,
   the electronic apparatus includes a plurality of electrochemical capacitors, and the applying section applies a minus potential to the positive electrode and a plus potential to the negative electrode in each of the plurality of electrochemical capacitors.

3. The electronic apparatus according to claim 2, wherein the applying section applies a minus potential to the positive electrode and a plus potential to the negative electrode in each of the plurality of electrochemical capacitors, sequentially.

4. The electronic apparatus according to claim 1, wherein
the electrochemical capacitor is one of a plurality of electrochemical capacitors,
the electronic apparatus includes a plurality of electrochemical capacitors, and the plurality of electrochemical capacitors are divided into a plurality of subunits including two or more of the electrochemical capacitors, and
the applying section applies a minus potential to a positive electrode and a plus potential to a negative electrode in each of the plurality of subunits.

5. The electronic apparatus according to claim 4, wherein the applying section applies a minus potential to the positive electrode and a plus potential to the negative electrode in each of the plurality of subunits, sequentially.

6. The electronic apparatus according to claim 1, wherein the applying section discharges the electrochemical capacitor before applying the minus potential to the positive electrode and the plus potential to the negative electrode.

7. The electronic apparatus according to claim 1, wherein the applying section discharges the electrochemical capacitor after applying the minus potential to the positive electrode and the plus potential to the negative electrode.

8. The electronic apparatus according to claim 1, further comprising:
a power source coupled in parallel to the electrochemical capacitor and configured to supply electric power to the electric load, and
a control circuit configured to control supply of electric power from the electrochemical capacitor and the power source to the electric load,
wherein the control circuit allows the electrochemical capacitor to supply electric power to the electric load in a case where electric power supplied from the power source alone is deficient for electric power necessary for the electric load.

9. The electronic apparatus according to claim 8, wherein the electric load is a motor, and the power source comprise at least any of a fuel cell and a rechargeable battery.

10. The electronic apparatus according to claim 9, wherein the control circuit charges the electrochemical capacitor with electric power generated by the motor at the time of reverse rotation of the motor.

11. A method for recovering capacitance of an electrochemical capacitor, the method comprising:
separating an electrochemical capacitor from the electric load, the electrochemical capacitor having a positive electrode, a negative electrode, and an electrolyte placed between the positive electrode and the negative electrode, and being configured to supply electric power to an electric load; and
applying a minus potential to the positive electrode and a plus potential to the negative electrode for at least one second and at longest two minutes.

* * * * *